F. LOHMAN.
TANK VALVE.
APPLICATION FILED APR. 25, 1908.
921,131.
Patented May 11, 1909.
2 SHEETS—SHEET 1.
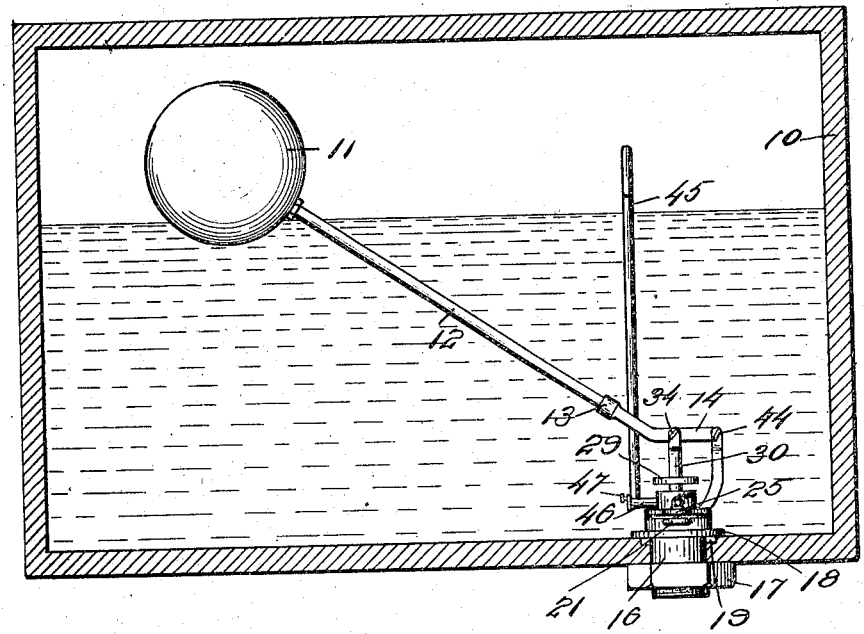
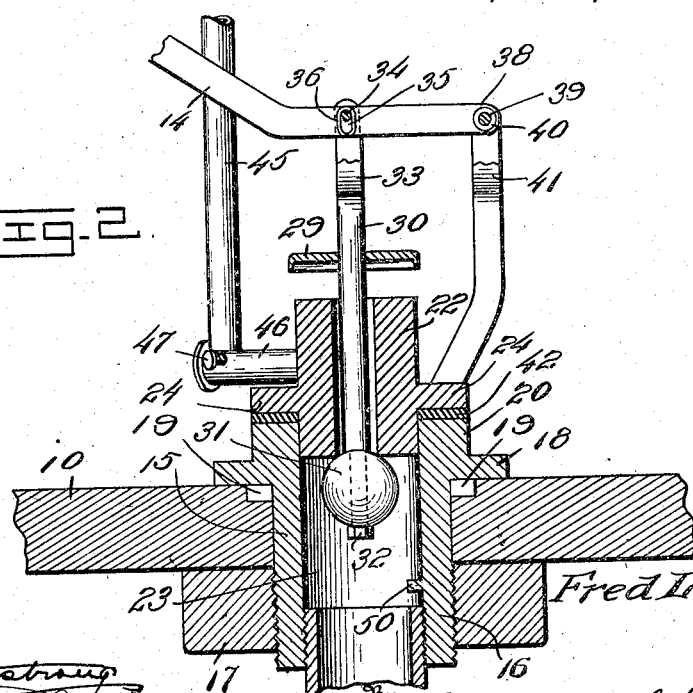

F. LOHMAN.
TANK VALVE.
APPLICATION FILED APR. 25, 1908.
921,131.
Patented May 11, 1909.
2 SHEETS—SHEET 2.
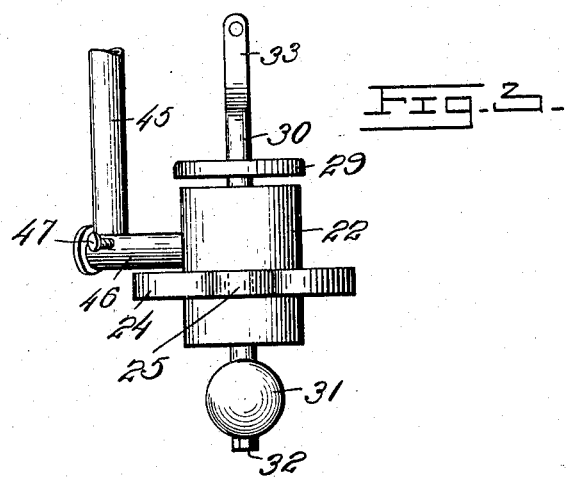
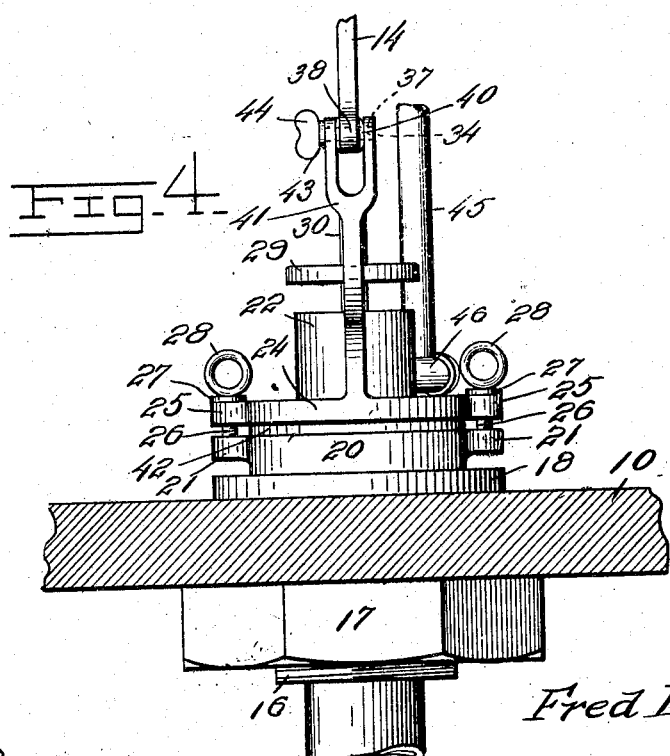
Witnesses
L. L. Armstrong
E. L. Chandlee
Inventor
Fred Lohman
By Woodward & Chandlee
Attorneys

UNITED STATES PATENT OFFICE.

FRED LOHMAN, OF LOS ANGELES, CALIFORNIA.

TANK-VALVE.

No. 921,131.     Specification of Letters Patent.     Patented May 11, 1909.

Application filed April 25, 1908. Serial No. 429,268.

*To all whom it may concern:*

Be it known that I, FRED LOHMAN, a citizen of the United States, residing at Los Angeles, in the county of Los Angeles and State of California, have invented certain new and useful Improvements in Tank-Valves, of which the following is a specification.

This invention relates to valves, and more particularly to that class which are used in flushing tanks of the character that are to be kept constantly full of water.

An object of the invention is to provide improvements in the construction of such valves.

Another object is to lessen the number of parts necessary for the operation of such a valve.

Another object is to obviate the cause of the noises which usually accompany the operation of such valves.

A still further object of the invention is to provide a valve of a character applicable to any kind of a tank of this nature.

Further objects are simplicity, durability, and economy in construction.

Other objects and advantages will be apparent from the following description and it will be understood that changes in the specific structure shown and described may be made within the scope of the claims and that any suitable materials may be used without departing from the spirit of the invention.

In the drawings forming a portion of this specification, and in which like numerals of reference indicate similar parts in the several views, Figure 1 is a side elevation of the valve applied to a tank, the tank being in section, Fig. 2 is a vertical sectional view of the valve, Fig. 3 is a detached side elevation of the valve stem and supporting collar, Fig. 4 is a side elevation of the tank at 90° of Fig. 1.

Referring to the drawings, 10 is a tank of suitable construction in which is placed this valve, 11 is the float which may be constructed of copper, glass or other material, which is supported by the stem 12 carried in the internally threaded sleeve 13 upon the outer extremity of the operating lever 14. The valve casing 15 comprises a hollow shank 16 externally and internally threaded, which is passed downwardly through the bottom of the tank 10 and secured thereto by a nut 17 which binds an annular flange 18, carried by the shank 16, against the upper side of the bottom of the tank 10. Two oppositely disposed studs 19 are formed integrally upon the outer surface of said shank 16 for the purpose of preventing rotative movement of the shank while being secured to the bottom of the tank 10. An annular vertically disposed flange 20 is integrally formed with the shank 16 and carries at its upper end diametrically disposed lugs 21 for a purpose to be hereinafter described.

A sleeve 22 extending into the aperture 23 of the flange 20 carries an annular flange 24 which is adapted to rest upon the upper face of the flange 20 and support said sleeve 22. The flange 24 is provided with diametrically disposed lugs 25 which register with lugs 21 carried by the sleeve 20 and which are secured to each other by suitable screws 26. The screws 26 have flanged heads 27 carrying eyes 28 upon their upper surface for the purpose of operating said screws 26 by any convenient tool which will admit of insertion in said eyes 28. A cap 29 is rigidly mounted over the upper end of the sleeve 22 upon a valve stem 30 for limiting the movement of the stem 30 and for closing the upper extremity of the sleeve 22. The valve stem 30 extends downwardly through the sleeve 22 and supports upon its lower end a ball valve 31 and a jam nut 32. The ball valve 31 is formed of rubber or like resilient material and is engaged upon said stem 30 by externally formed threads on the lower extremity of said stem 30. The jam nut 32 carries internal threads for its engagement with the stem 30 and is impinged against the lower end of the valve 31. The valve stem 30 extends upwardly through said cap 29 and is forked as at 33. The two arms of the fork 33 are apertured at their upper ends to receive pivot 34 which supports the operating lever 14. The operating lever 14 is apertured as at a point 35 around which is formed a boss 36 adapted to engage the inner surface of the fork 33 for the purpose of reducing the frictional contact surface of the lever 14. Projecting upwardly parallel to the fork 33 there is a second pair of arms constituting a fork 41 carried by the flange 24 and having apertures 37 to engage the inner stationary end 38 of the lever 14 which is apertured at 39 and carries a boss 40. A similar pivot 34 to that in fork 33 is positioned in the aperture 39 for supporting the end of the lever 14. A suitable packing 42 is interposed between the upper face of the flange 20 and the flange 24 to prevent leakage of water.

The pivots 34 comprise thumb screws having enlarged heads 43 having lugs 44 upon their outer faces so that the pivots 34 may be removed by the hand.

The aperture 35 in the lever 14 is slightly elongated so as to allow for a movement of the lever 14 before lifting the valve stem 30 and closing the valve 31. When used in a low down tank for water closets tube 45 is secured to an inlet tube 46 by threads or by a thumb screw 47, as shown. The inlet tube 46 is formed on one side of the sleeve 22 through which the water is adapted to flow into the tank 10 and through the after flow pipe 45 to fill the water closet bowl after flushing. The shank 16 also carries a lug 50 integrally formed upon the interior surface thereof.

In operation, when the tank 10 is empty the float 11 falls, and through the stem 12 draws down the operating lever 14; by which action the valve stem 30 is depressed and the valve 31 is disengaged from the under surface of the sleeve 22 whereupon water, under pressure in the passage 23 of the shank 16, is released through the sleeve 22 and out of the inlet pipe 46 into the tank 10 and through the after flow pipe 45. As the float rises the lever 14 is moved through a certain distance without operating the valve stem 30 on account of the elongated aperture 35 through which the pivot 34 passes carried by the forked ends 33 of the valve stem 30. When the float reaches the predetermined height on the surface of the water the valve stem 30 is drawn upward and the valve 31 abuts against the under surface of the sleeve 22 closing access of water to the tank 10, in which position it remains until the water in the tank 10 is drawn off and the float falls when the above described action takes place.

The lugs 19, which are formed integral with the shank 16 are for the purpose holding said shank 16 and the valve mechanism at the required angle and to keep the same from turning when the nut 17 is being applied to the end of the shank on the under side of the bottom of the tank 10. When slip joints are made it is necessary to form a lug 50 on the inside of the shank 16 to keep the end of a pipe from abutting against the lower end of the valve stem 30 and hinder the operation of the lever 31.

What is claimed is:—

1. A device of the class described comprising a shank, a flange on said shank, an upwardly extending flange on said shank, a sleeve, a flange on said sleeve, lugs on said last named flange and on said upwardly extending flange, screws for fastening said flanges together, said screws having eyes formed therein, a cap over said sleeve, a stem passing through said cap, a valve carried on the lower end of said stem, a forked portion carried on the upper end of said stem, a forked arm carried by said flange on said sleeve extending parallel to said forked portion and an operating lever carried by said forked portion and said forked arm.

2. In a device of the character described the combination with a hollow shank, a sleeve disposed in the upper end of said shank and a valve and its mechanism carried by said sleeve, of radially extended lugs on said shank, an interiorly formed lug on said shank, an inlet pipe carried by said sleeve and an after flow pipe disposed in communication with said inlet pipe.

In testimony whereof I affix my signature, in presence of two witnesses.

FRED LOHMAN.

Witnesses:
L. M. FALL,
W. V. GILLETTE.